(12) United States Patent
Katta

(10) Patent No.: US 12,316,620 B1
(45) Date of Patent: May 27, 2025

(54) SECURE DEVICE COMMUNICATION USING MULTI-KEY ENCAPSULATION

(71) Applicant: aapoon Inc., Houston, TX (US)

(72) Inventor: Srinivasa Katta, Austin, TX (US)

(73) Assignee: aapoon, Inc., Houston, TX (US)

( * ) Notice: Subject to any disclaimer, the term of this patent is extended or adjusted under 35 U.S.C. 154(b) by 0 days.

(21) Appl. No.: 18/961,639

(22) Filed: Nov. 27, 2024

(51) Int. Cl.
    *H04L 29/06*     (2006.01)
    *H04L 9/40*     (2022.01)

(52) U.S. Cl.
    CPC ........ *H04L 63/062* (2013.01); *H04L 63/0428* (2013.01)

(58) Field of Classification Search
    CPC .................. H04L 63/062; H04L 63/0428
    See application file for complete search history.

(56) References Cited

U.S. PATENT DOCUMENTS

| | | | | |
|---|---|---|---|---|
| 11,153,080 | B1 * | 10/2021 | Nix | ........................ H04L 9/3093 |
| 2022/0038269 | A1 | 2/2022 | Nix | |
| 2023/0247010 | A1 * | 8/2023 | O'Connell | .............. H04L 9/065 |
| | | | | 713/151 |
| 2023/0353349 | A1 * | 11/2023 | Cap | ........................ H04L 9/0897 |
| 2024/0235842 | A1 * | 7/2024 | Watson | .................. H04L 9/0861 |
| 2025/0016140 | A1 * | 1/2025 | Chikara | ................ H04L 9/3073 |

FOREIGN PATENT DOCUMENTS

| | | |
|---|---|---|
| CN | 114629646 A | 6/2022 |
| WO | 2022239129 A1 | 11/2022 |

* cited by examiner

*Primary Examiner* — Vance M Little
(74) *Attorney, Agent, or Firm* — Jason A. Smith; Shumaker, Loop & Kendrick, LLP

(57) ABSTRACT

A method for establishing secure communication between a first device and a second device. The method includes generating ephemeral keys at the first device, encapsulating a public key of the second device to generate a first cipher key and a first shared secret key, transmitting a first message to the second device comprising the ephemeral public key and the first cipher key, receiving a second message from the second device containing a second cipher key, decapsulating the second cipher key to achieve a second shared secret key, receiving and decapsulating a third cipher key to achieve a third shared secret key, deriving a final encryption key using the first, second, and third shared secret keys, and establishing secure communication by encrypting communication using the final encryption key. The method further includes verifying the final encryption key with the second device through hash exchange.

13 Claims, 7 Drawing Sheets

SECURE DEVICE COMMUNICATION USING MULTI-KEY ENCAPSULATION

PRIORITY INFORMATION

The present application does not claim a priority from any other application.

TECHNICAL FIELD

The present disclosure relates generally to secure communication systems and methods. More specifically, the disclosure pertains to peer-to-peer communication techniques utilizing post-quantum cryptography to provide enhanced security against potential attacks by quantum computers.

BACKGROUND

Secure communication between devices has become increasingly important in today's interconnected world. As more sensitive information is transmitted electronically, there is a growing need for robust encryption methods to protect data from unauthorized access or interception. Traditional encryption methods have relied on public key infrastructure (PKI) systems, where devices exchange public keys to establish secure connections. However, these systems can be vulnerable to various attacks, including man-in-the-middle attacks and compromised certificate authorities. Post-quantum cryptography has emerged as a potential solution to address vulnerabilities in existing encryption methods. As quantum computers advance, they pose a threat to current cryptographic algorithms. Post-quantum algorithms aim to provide security even against attacks from quantum computers. Key encapsulation mechanisms (KEMs) are cryptographic protocols used to securely exchange encryption keys between parties. KEMs can provide forward secrecy, ensuring that past communications remain secure even if long-term keys are compromised in the future. Implementing secure communication protocols on resource-constrained devices presents additional challenges. Mobile devices and Internet of Things (IoT) sensors often have limited processing power and battery life, necessitating efficient crypto graphic algorithms. Authentication of devices is another critical aspect of secure communication. Ensuring that devices are who they claim to be helps prevent impersonation attacks and unauthorized access to sensitive information. As the number of connected devices continues to grow exponentially, scalable and efficient methods for establishing secure communication channels between large numbers of devices are increasingly important. There is an ongoing need for improved secure communication protocols that can meet the evolving challenges of the digital landscape.

Thus, in the landscape of secure communication systems, traditional methods have predominantly relied on centralized public key infrastructure (PKI) and symmetric key encryption to establish secure channels between devices. These systems typically involve a complex orchestration of exchanging public keys, verifying digital certificates issued by trusted certificate authorities, and using shared secret keys for data encryption. While effective, these approaches often necessitate frequent interactions with central servers for key management, certificate validation, and sometimes even for session key establishment. This server-centric model has been the foundation for protocols like SSL/TLS in secure web browsing, IPsec for virtual private networks, and various secure messaging applications. While robust, this architecture can introduce latency, create single points of failure, and potentially compromise privacy due to the central server's involvement in communications.

Current secure communication systems, despite their widespread adoption, often exhibit shortcomings that can impact their efficiency and security in certain scenarios. Many existing systems rely heavily on server infrastructure for routine operations, which can lead to increased latency and potential bottlenecks, especially in high-traffic situations. This server dependency can also create privacy concerns, as central servers may have access to metadata or even content of communications. In IoT and edge computing scenarios, where devices may have intermittent connectivity or limited resources, constant server communication for security operations can be impractical or power intensive. Additionally, the reliance on central authorities for every aspect of security can create vulnerabilities-if a certificate authority is compromised, it could potentially affect the security of all dependent devices. Many current systems also lack true peer-to-peer capabilities, limiting their flexibility in ad-hoc or mesh network scenarios. Furthermore, the computational overhead of frequent server-based cryptographic operations can be significant, potentially impacting performance on resource-constrained devices.

SUMMARY

Before the present device(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a device and a method for verification of a user. This summary is not intended to identify essential features of the claimed subject matter nor is it intended for use in determining or limiting the scope of the claimed subject matter.

In one implementation, a method for establishing secure peer-to-peer (P2P) communication is disclosed. The method comprises generating, by a first device, ephemeral keys. The ephemeral keys comprise an ephemeral public key and ephemeral secret key of the first device. A public key corresponding to the second device is encapsulated to generate a first cipher key and a first shared secret key. The public key is obtained from a certificate corresponding to the second device. A first message is transmitted to the second device comprising the ephemeral public key, a public key corresponding to the first device, and the first cipher key. A second message is received from the second device comprising a second cipher key. The second cipher key is decapsulated using the ephemeral secret key of the first device to achieve a second shared secret key. A third cipher key from the second device is received. Further, the third cipher key is decapsulated using a secret key of the first device to achieve the third shared secret key. A first final encryption key is derived using the first shared secret key, the second shared secret key, and a third shared secret key and finally secure communication is established by encrypting communication using the first final encryption key.

In another implementation a method for establishing secure peer-to-peer (P2P) communication, is disclosed. The method comprises generating, by a second device, ephemeral keys. The ephemeral keys comprise an ephemeral public key and ephemeral secret key of the second device. A first cipher key is decapsulated using a secret key of the second device to achieve first share secret key received from a first device. further, the ephemeral public key of the first device is encapsulated to generate a second cipher key and a second shared secret key, and a second message is transmitted to the first device comprising the second cipher key. Further, the public key is encapsulated corresponding to the first device to generate a third cipher key and a third shared secret key. Further, the third cipher key to the first device is transmitted. A hash of a first final encryption key is received. Further, a second final encryption key is derived using the first shared secret, the second shared secret, and a third shared secret. Furthermore, the first final encryption key is verified by hashing the second final encryption key. Further, hash of the second final encryption key is transmitted. Finally, an encrypted communication is received and is decrypted by using the second final encryption key.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for a user verification disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
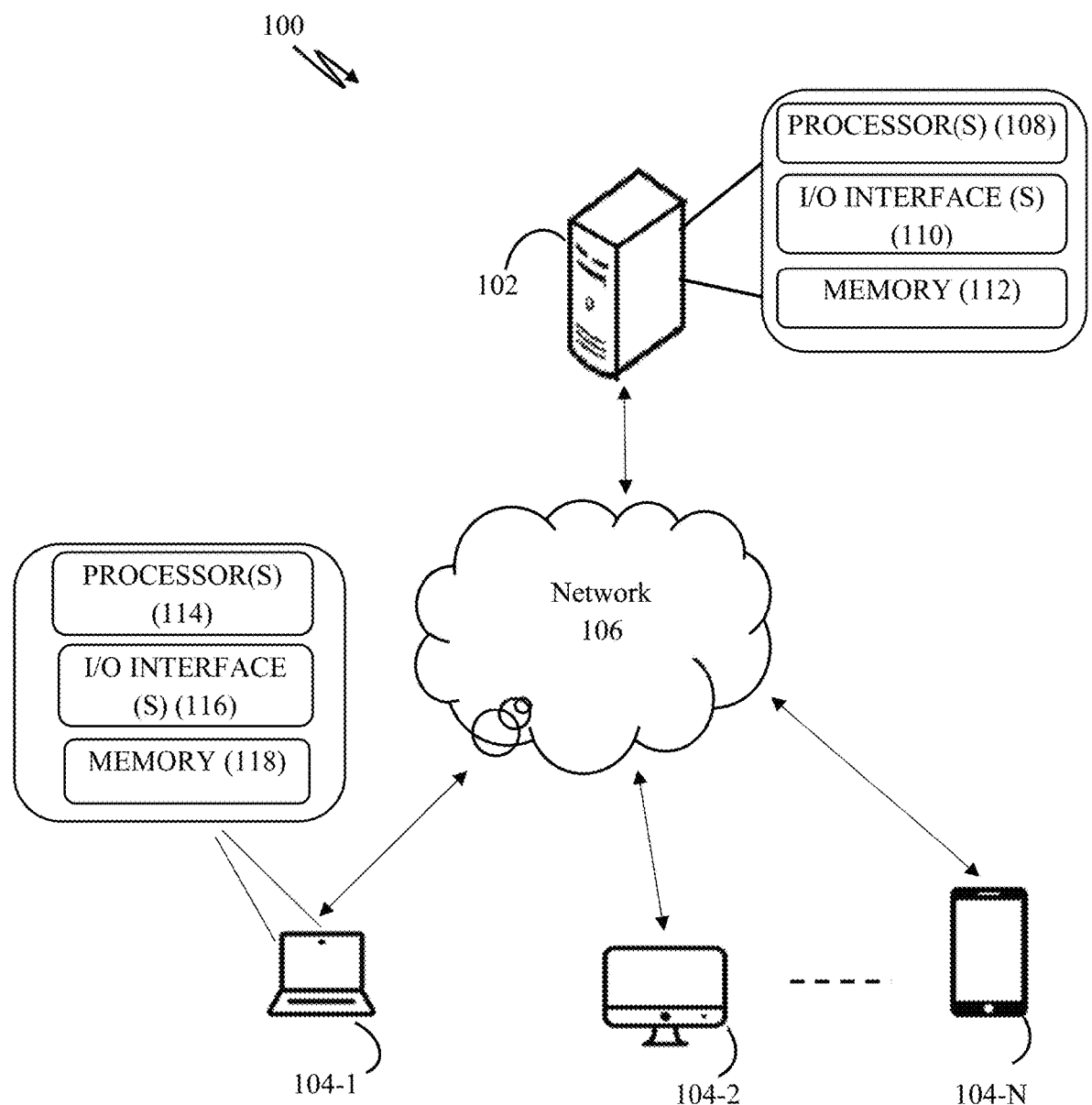
FIG. 1 illustrates a network implementation for establishing secure peer-to-peer (P2P) communication, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "generating," "encapsulating," "transmitting," "decapsulating," "deriving," "encrypting," and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any device and methods similar or equivalent to those described herein can be used in the practice or testing of embodiments of the present disclosure, the exemplary device and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The proposed system overcomes these challenges through an innovative, device-centric approach to secure communication. Unlike traditional methods, this system enables direct device-to-device communication with minimal server intervention, primarily limiting server interaction to initial device authentication. By generating ephemeral keys for each session and performing key encapsulation and derivation operations locally, devices can establish secure channels without constant server mediation. This approach significantly reduces latency, enhances privacy, and improves scalability in large or dynamic networks. The system's use of multiple shared secrets derived through local key encapsulation mechanisms not only enhances security but also provides potential quantum resistance without requiring server updates. By allowing devices to authenticate each other directly using pre-exchanged certificates, the system minimizes ongoing server dependencies while maintaining trust. The peer-to-peer nature of the key agreement and encryption processes makes the system particularly well-suited for IoT environments, edge computing scenarios, and ad-hoc networks where constant server connectivity may be impractical. This device-to-device focus, combined with the multi-layered key derivation and verification process, creates a more resilient, efficient, and adaptable secure communication framework. It addresses many shortcomings of current server-centric systems while still allowing for centralized management and authentication when necessary, striking a balance between security, efficiency, and autonomy in device communications.

The present subject matter discloses a method for establishing secure peer-to-peer (P2P) communication. The secure peer-to-peer communication may be achieved using post-quantum cryptography. This may provide a high level of security against quantum computing attacks, thereby enhancing the security of the communication between the peer devices.

Referring now to FIG. 1, a network implementation 100 for establishing secure peer-to-peer (P2P) communication is disclosed. In an embodiment, an application may be installed on one or more peer devices 104-1 . . . 104-N, collectively referred to as device 104 (hereinafter), such as the first peer device 104-1 interacts with the installed application to perform one or more steps for establishing secure peer-to-peer (P2P) communication. In yet another embodiment, an application may be installed on the second peer device 104-2, such that the peer device 104-2 interacts with the installed application to perform one or more steps for establishing secure peer-to-peer (P2P) communication. The application may include various steps for establishing secure peer-to-peer (P2P) communication performed by the present invention. Examples of the peer devices 104 may include, but are not limited to, a portable computer, a personal digital assistant, a handheld device, and a workstation. The first peer device 104-1 is communicatively coupled to the second peer device 104-2 through a network 106.

In an embodiment a system 102 may be implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. The system 102 may be accessed by multiple users through one or more peer devices 104-1, 104-2 . . . 104-N via network 106. The user of the peer devices 104 may register the peer devices 104-1, 104-2 using the I/O interface 110 in order to use the server 102. In one implementation, the server 102 may comprise the cloud-based computing environment in which the user may operate individual computing systems configured to execute remotely located applications. In an embodiment, the server 102 may be configured to generate and distribute signed certificates for the peer devices. The server may receive a certificate signing request (CSR) from a device, generate a signed certificate using the CSR, and transmit the signed certificate to the requesting device. The server may also receive requests for certificates of other devices, from a device, and transmit the requested certificates to the requesting device.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the server 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the server 102 to interact with the peer devices 104 directly or through the system 102. Further, the I/O interface 110 may enable the server 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic Random Access Memory (DRAM), and/or non-volatile memory, such as Read-Only Memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the user device 104. In one embodiment, the memory 112, amongst other things, serves as a repository for storing data processed, received, and generated by one or more of the programs or the coded instructions.

In one embodiment, the first peer device 104 may include at least one processor 114, an input/output (I/O) interface 116, and a memory 118. The at least one processor 114 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 114 is configured to fetch and execute computer-readable instructions stored in the memory 118.

The I/O interface 116 may include a variety of software and hardware interfaces, for example, a web interface, a graphical user interface, and the like. The I/O interface 116 may allow the peer device 104-1 to interact with the second peer device 104-2 or to the server 102. The peer device 104-1 may connect with the peer device 104-2 via the network 106. In yet another embodiment the peer device 104-1 may connect with the peer device 104-2 via different network. Further, the I/O interface 116 may enable the peer device 104 to communicate with other computing devices, such as web servers and external data servers (not shown). The I/O interface 116 can facilitate multiple communications within a wide variety of networks and protocol types, including wired networks, for example, LAN, cable, etc., and wireless networks, such as WLAN, cellular, or satellite. The I/O interface 116 may include one or more ports for connecting a number of devices to one another or to another server.

The memory 118 may include any computer-readable medium or computer program product known in the art including, for example, volatile memory, such as static random-access memory (SRAM) and dynamic Random Access Memory (DRAM), and/or non-volatile memory, such as Read-Only Memory (ROM), erasable programmable ROM, flash memories, hard disks, Solid State Disks (SSD), optical disks, and magnetic tapes. The memory 118 may include routines, programs, objects, components, data structures, etc., which perform particular tasks or implement particular abstract data types. The memory 118 may include programs or coded instructions that supplement applications and functions of the peer device 104. In one embodiment, the memory 118, amongst other things, serves as a repository for storing data processed, received, and generated by one or more of the programs or the coded instructions. In an embodiment, the second peer device 104-2 may include at least a processor, an interface, and a memory as discussed above for the peer device 104-1.

In an alternate embodiment, the first peer device 104-1 and the second peer device 104-2 may be configured to perform the one or more steps for establishing secure peer-to-peer (P2P) communication disclosed in the present disclosure. In an embodiment the peer devices may communicate with each other and the server 102 via network 106. In yet another embodiment, the peer devices may communicate with each other via different network than with the server 102. As there are various challenges observed in the existing art, the challenges necessitate the need for a secure peer-to-peer (P2P) communication method or a system that is able to mitigate the risk of security breaches in P2P communication. The detailed functioning of the first and second peer devices is described below with the help of figures.

In an embodiment, an encryption key pair may be generated at a peer device 104. For example, at the first peer device 104-1 and at the second peer device 104-2. The encryption key may comprise a secret key and a public key. These keys may be generated using a cryptographic algorithm, such as PQ algorithms like Dilithium, Kyber, or any other public-key cryptography method. The secret key is kept secret and is used for decrypting data that has been encrypted with the corresponding public key. The public key can be shared and can be distributed to anyone. The public key is used for encrypting data or for verifying digital signatures created with the corresponding private key. In an embodiment, the private key is stored on the device at which it is generated. In an embodiment, the public key may be transmitted to another device or devices.

Figure 2:
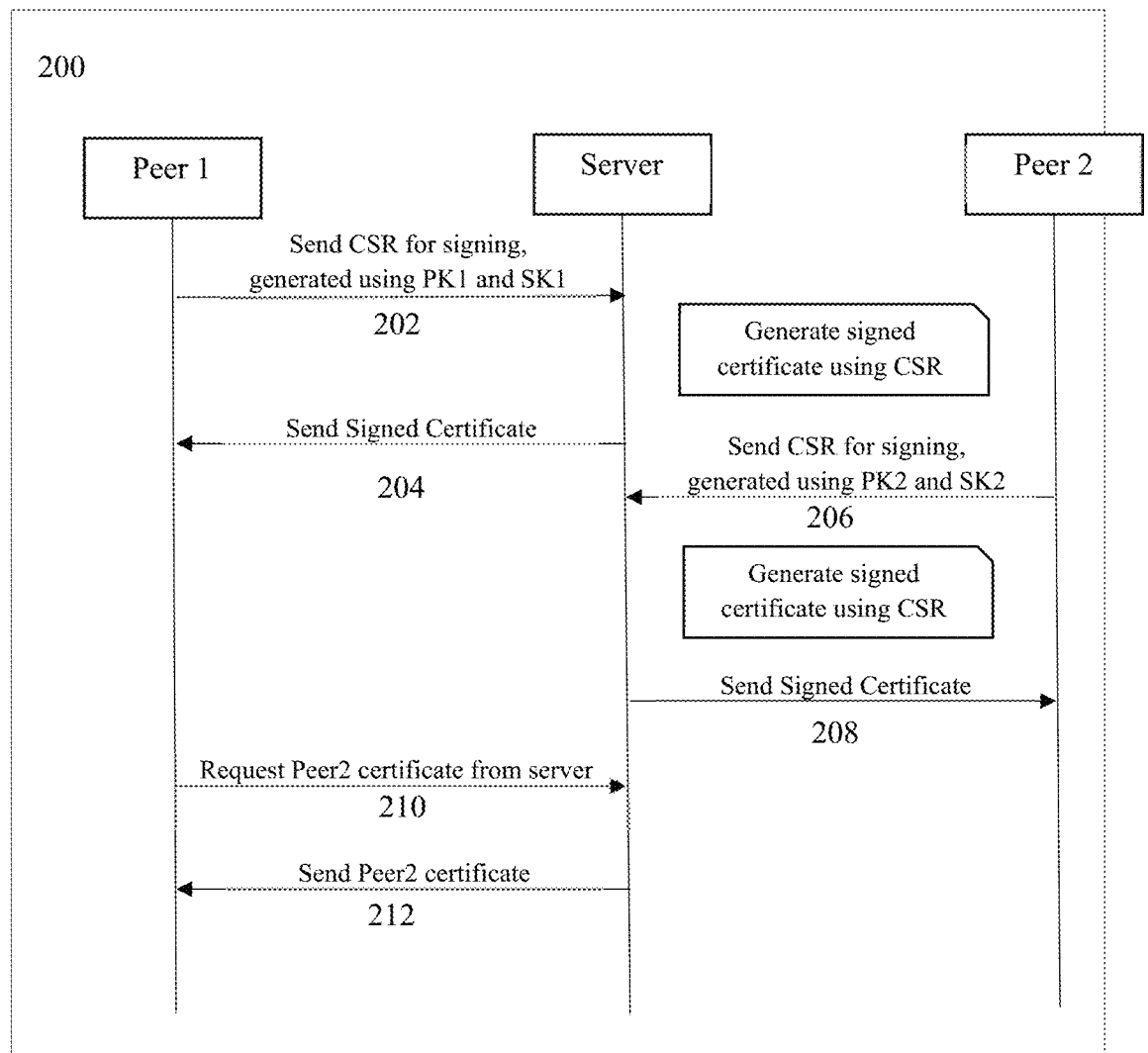
FIG. 2 illustrates a method of authentication for establishing secure peer-to-peer (P2P) communication, in accordance with an embodiment of the present subject matter.

Referring now to FIG. 2, a method for establishing secure peer-to-peer (P2P) communication is shown, in accordance with an embodiment of the present subject matter. In an embodiment, the first peer device 104-1 may generate a certificate signing request (CSR) using its public key and secret key. As discussed above the public key and the secret key is generated at the first peer device 104-1. The CSR may include information such as the public key of the first device and identifying information associated with the first device. The first device at 202 may then transmit the CSR to a certificate authority server for verification and signing. For example, the CSR may be transmitted to the server 102. Upon receiving the CSR, the certificate authority server may verify the CSR to ensure the authenticity of the first device and the validity of the identifying information. Upon successful verification, the certificate authority server may generate a digital certificate for the first device. The digital certificate may include the public key of the first device and the identifying information associated with the first device. The certificate authority server may then sign the digital certificate using its private key and at 204 may transmit the signed digital certificate back to the first device. In an embodiment, the first device may store the received signed digital certificate for use in future secure communications. The first device may periodically check the validity of the stored digital certificate with the certificate authority server and may request a new digital certificate from the certificate authority server if the stored digital certificate is revoked or expired. In an embodiment, the server may generate the singed certificate after a predetermined period of time at regular intervals and share the certificate with the first device.

In an embodiment, similarly, the second peer device 104-2 may also generate a CSR, transmit it to the certificate authority server 102 at step 206, and receive, at step 208, a signed digital certificate from the certificate authority server. The second device may also store the received signed digital certificate for use in future secure communications and may periodically check the validity of the stored digital certificate with the certificate authority server.

In an embodiment, the first device may request and receive the digital certificate for the second device 104-2, from the certificate authority server 102, during the process of establishing secure communication, at steps 210 and 212, respectively. The first device may use the public key included in the digital certificate of the second device to encapsulate and generate the first cipher key and the first shared secret key. In yet another embodiment, the second device may request and receive the digital certificate for the first device 104-1 from the certificate authority server 102 and may use the public key included in the digital certificate of the first device to encapsulate and generate a second cipher key and a second shared secret key. In this way, the process of generating and obtaining digital certificates for the devices may enhance the security of the communication between the devices by ensuring that the devices are authenticated and trusted entities for communication.

Figure 3A:
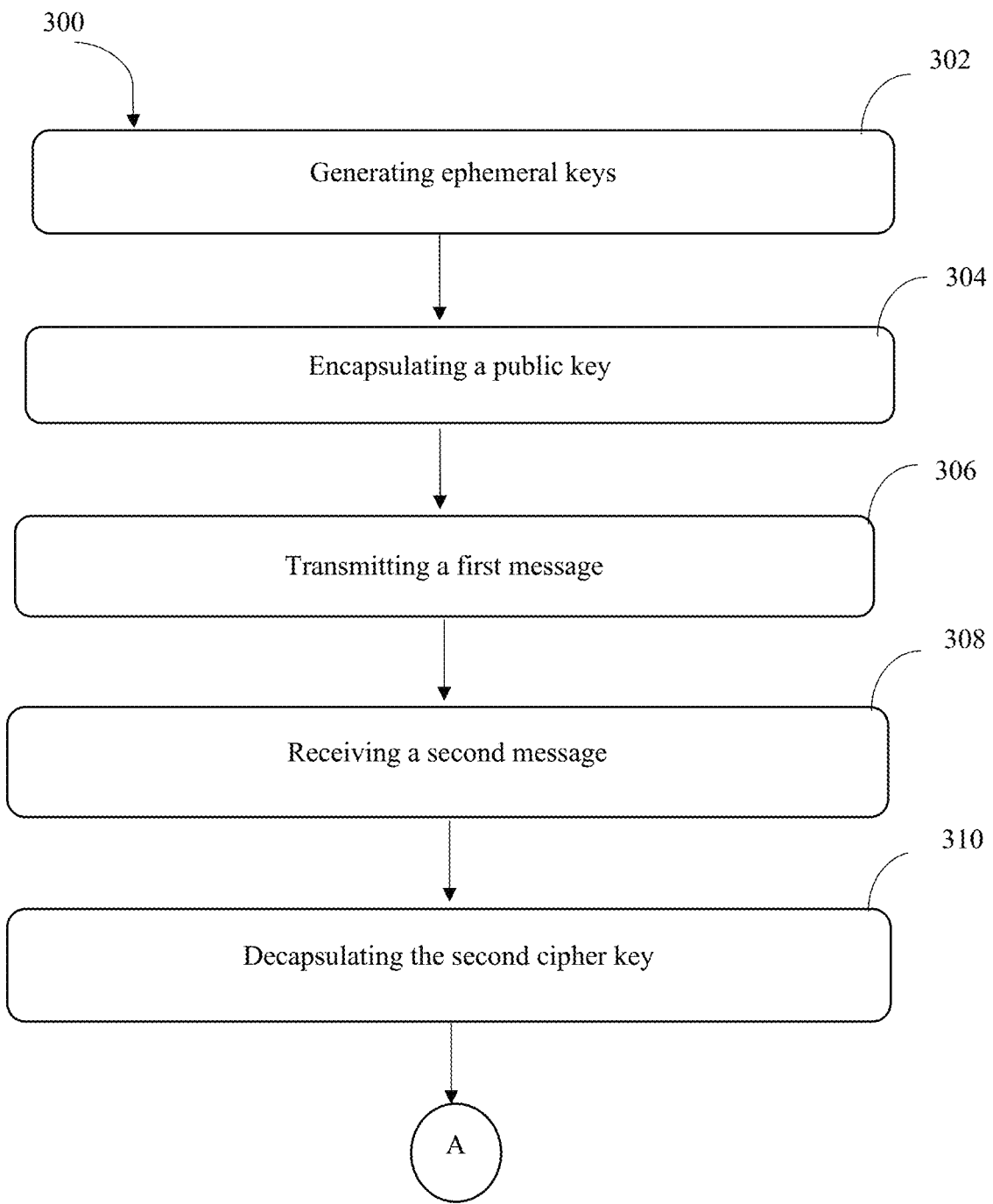
FIGS. 3A and 3B illustrates a method for establishing secure peer-to-peer (P2P) communication, in accordance with an embodiment of the present subject matter.
Figure 3B:
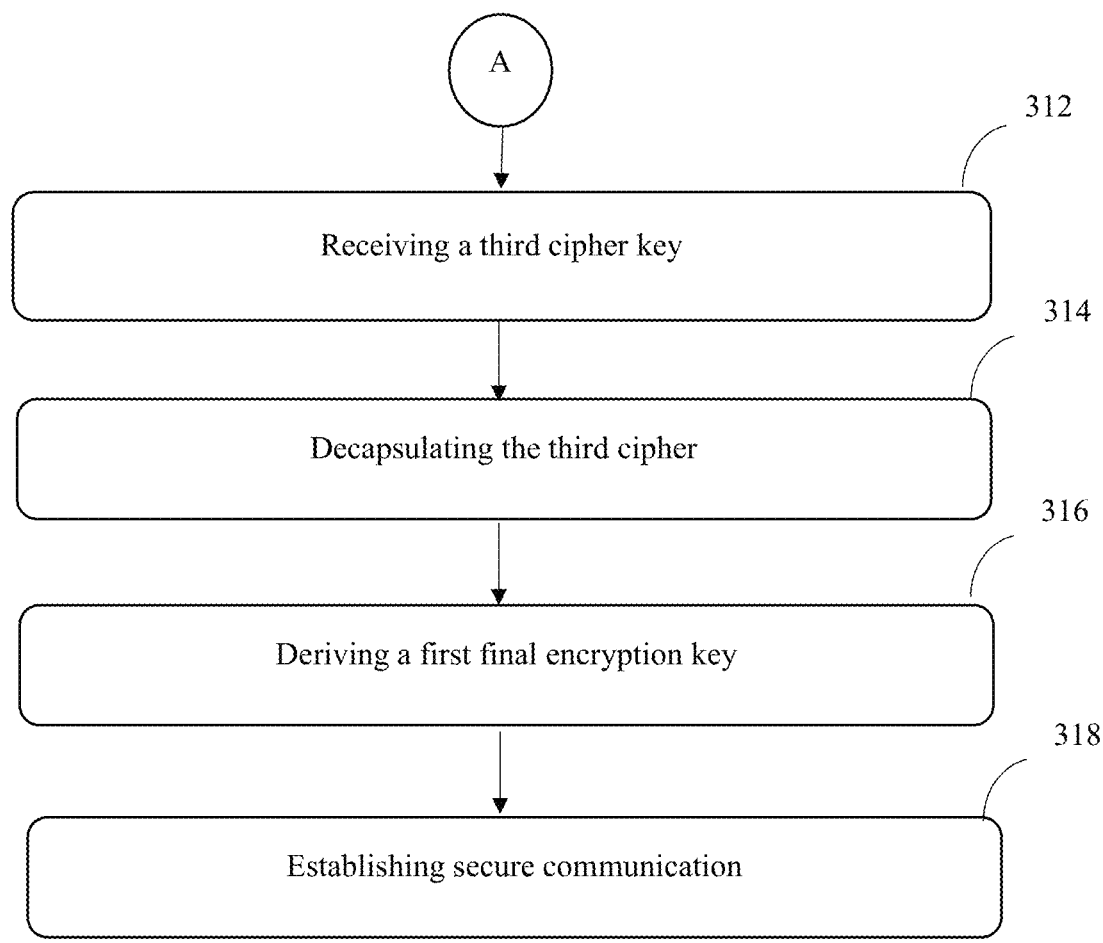

Referring now to FIGS. 3 (3*a* and 3*b*), a method 300 for establishing secure peer-to-peer (P2P) communication is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. For example, in an embodiment, the method may be configured to establish secure communication between the devices (first peer device 104-1 and the second peer device 104-1) using the derived final encryption keys. The secure communication may involve encrypting and decrypting messages using the final encryption keys. The system provides a robust and efficient approach to secure communication between devices, leveraging multiple shared secrets and key encapsulation mechanisms to derive a final encryption key. This approach enhances the security of the communication and provides flexibility for implementation across various types of devices and communication scenarios.

The order in which the method 300, is described is not intended to be construed as a limitation, and any number of the described method blocks can be combined in any order to implement the method 300 or alternate methods for secure peer-to-peer communication. Additionally, individual blocks may be deleted from the method 300 without departing from the scope of the subject matter described herein. Furthermore, the method 300 for secure peer-to-peer communication can be implemented in any suitable hardware, software, firmware, or combination thereof.

In an embodiment, now referring to FIG. 3, at step 302, ephemeral keys are generated at the first device 104-1. The first device is configured to generate the ephemeral keys. In an embodiment, the first device may generate ephemeral keys for a secure communication session. The secure communication may refer to a process where two or more devices establish a communication session that ensures the confidentiality, integrity, and authenticity of the exchanged one or more messages. For example, the messages may include text, files, multimedia, and the like. The ephemeral keys may include an ephemeral public key and an ephemeral secret key. These keys may be generated for a single session and may be discarded after the session ends. This approach may enhance the security of the communication by ensuring that the keys used for a particular session cannot be reused for another session, thereby reducing the risk of key compromise. In an embodiment, the ephemeral keys may be generated using a cryptographic algorithm. The cryptographic algorithm may be selected based on various factors, such as the security requirements of the communication, the computational resources available on the first device, and the compatibility of the algorithm with the second device.

In an embodiment, the ephemeral keys may be generated at the beginning of the communication session, prior to the transmission of any secure data. The generation of the ephemeral keys may be triggered by various events, such as the initiation of a secure communication session, the receipt of a request for secure communication from the second device, or the detection of a security threat. In an embodiment, the ephemeral keys may be stored in a memory of the first device during the communication session. The memory may be protected from unauthorized access to prevent the compromise of the ephemeral keys. After the communication session ends, the ephemeral keys may be erased from the memory. The erasure of the ephemeral keys may be performed using various techniques, such as overwriting the memory with random data, performing a secure delete operation, or physically destroying the memory area. This approach may ensure that the ephemeral keys cannot be recovered after the session ends, thereby further enhancing the security of the communication.

In an embodiment, at step 304, the peer device 104-1 may be configured to encapsulate a public key corresponding to the second device 104-2 to generate a first cipher key and a first shared secret key. The public key is obtained from the certificate received by the first device, corresponding to the second device 104-2. In an embodiment, the first device may encapsulate the public key of the second device to generate a first cipher key and a first shared secret key. The encapsulation process may involve using a cryptographic algorithm to transform the public key of the second device into a cipher key and a shared secret key. The cryptographic algorithm may be selected based on various factors, such as the security requirements of the communication, the computational resources available on the first device, and the compatibility of the algorithm with the second device.

In an embodiment, the encapsulation process performed by the first device may involve using a post-quantum cryptographic algorithm, such as the Kyber algorithm, to generate the first cipher key and the first shared secret key. The Kyber algorithm is a lattice-based key encapsulation mechanism (KEM) that is designed to be resistant to attacks by quantum computers. In this process, the first device may obtain the public key of the second device from a certificate corresponding to the second device. The certificate may have been previously obtained from a certificate authority or exchanged during an initial authentication phase. The first device may then use the Kyber algorithm to encapsulate this public key, generating the first cipher key and the first shared secret key. The Kyber algorithm's encapsulation process may involve several steps. It may begin with the generation of a random value, which is then combined with the second device's public key using lattice-based operations. These operations may include polynomial multiplications and additions in a specific ring. The result of these operations produces the first cipher key, which is intended to be sent to the second device, and the first shared secret key, which is kept by the first device. In an embodiment, the device may support multiple post-quantum algorithms for key encapsulation. For example, in addition to Kyber, the device may support algorithms such as Frodo, BIKE, or NTRU. Each of these algorithms has its own unique approach to key encapsulation: Frodo is based on the learning with errors (LWE) problem and uses matrix operations for encapsulation. It may involve generating a random matrix and performing matrix multiplications and additions to produce the cipher key and shared secret. BIKE (Bit Flipping Key Encapsulation) is based on quasi-cyclic moderate density parity check codes. Its encapsulation process may involve operations on binary polynomials, including multiplications and additions in a specific finite field. NTRU is based on the shortest vector problem in lattices. Its encapsulation process may involve polynomial operations in specific quotient rings, including multiplications and inversions. The choice of algorithm may depend on factors such as the security requirements, computational resources of the devices, and specific use case scenarios. The system may allow for algorithm negotiation between devices or may use a predetermined algorithm based on the deployment context. By supporting multiple algorithms, the system may provide flexibility and futureproofing, allowing for algorithm updates or replacements as cryptographic research advances, without necessitating a complete overhaul of the communication protocol.

In an embodiment, the encapsulation process may involve applying the cryptographic algorithm to the public key of the second device and a random value generated by the first device. The random value may be used as an input to the cryptographic algorithm along with the public key of the second device. The output of the cryptographic algorithm may be a cipher key and a shared secret key. The cipher key may be used for encrypting data during the communication session, while the shared secret key may be used for deriving a final encryption key. In an embodiment, the first device may encapsulate the public key of the second device using a different cryptographic algorithm or a different set of parameters for the same cryptographic algorithm. This may result in a different first cipher key and a different first shared secret key. The different first cipher key and the different first shared secret key may be used for establishing secure communication with the second device under different conditions or requirements.

Let's use the Kyber algorithm as an example to illustrate the encapsulation process and the generation of the first cipher key and first shared secret key. Here's a step-by-step explanation: 1. The first device (104-1) obtains the public key of the second device (104-2) from its certificate. 2. The first device generates a random value, let's call it 'r'. 3. The first device uses the Kyber algorithm to encapsulate the public key of the second device. This process involves: combining 'r' with the second device's public key using lattice-based operations. Performing polynomial multiplications and additions in a specific ring. The output of this process produces two key components: The first cipher key (c): This is intended to be sent to the second device. The first shared secret key (ss): This is kept by the first device. Here's a simplified pseudocode representation:

$$\text{public\_key\_2} = \text{get\_public\_key\_from\_certificate}(\text{device\_104\_2})$$

$$r = \text{generate\_random\_value}()$$

$$c, ss = \text{kyber\_encapsulate}(\text{public\_key\_2}, r)$$

Where:
'c' is the first cipher key
'ss' is the first shared secret key

Thus, in this process, the first cipher key (c) is a transformation of the second device's public key and the random value 'r'. It's designed so that only the second device, with its corresponding private key, can decrypt it to obtain the shared secret. The first shared secret key (ss) is derived during the encapsulation process and is known only to the first device at this point. The first device will then send the first cipher key (c) to the second device as part of the key exchange process. The second device will use its secret key to decrypt this cipher key and obtain the same shared secret. This process ensures that both devices can arrive at the same shared secret key without directly transmitting it, providing a secure method for key agreement.

In an embodiment, at step 306, the first peer device 104-1 is configured to transmit a first message to the second device 104-2 comprising the ephemeral public key, a public key corresponding to the first device, and the first cipher key. For example, the first device may transmit the first cipher key to the second device as part of a first message. The first message may also include the ephemeral public key of the first device and a public key of the first device. The first cipher key may be transmitted in an encrypted form to protect it from unauthorized access during transmission. The encryption of the first cipher key may be performed using the ephemeral secret key of the first device. For example, this ephemeral public key, generated as part of the ephemeral keys at the first device, may be used by the second device to generate a shared secret key. Another component of the first message is the public key of the first device. This public key, which may be part of the certificate of the first device, may be used by the second device to authenticate the first device and to ensure that the first message is indeed coming from the first device. The first message may also include the first cipher key. This first cipher key, generated by encapsulating the public key of the second device, may be used by the second device to derive the first shared secret key. The first cipher key may be transmitted in an encrypted form to protect it from unauthorized access during transmission.

In an embodiment, the first device may transmit the first message to the second device over a secure communication channel. The secure communication channel may be established using various techniques, such as secure socket layer (SSL) or transport layer security (TLS) protocols. The secure communication channel may provide an additional layer of security by encrypting the entire communication between the first device and the second device. In yet another embodiment, the first device may transmit the first message to the second device using a different communication protocol or a different communication channel. For example, the first device may transmit the first message over a wireless communication channel, such as a Wi-Fi or cellular network. Alternatively, the first device may transmit the first message over a wired communication channel, such as an Ethernet network. The choice of the communication protocol or the communication channel may depend on various factors, such as the capabilities of the first device and the second device, the security requirements of the communication, and the availability of the communication channels.

Figure 4A:
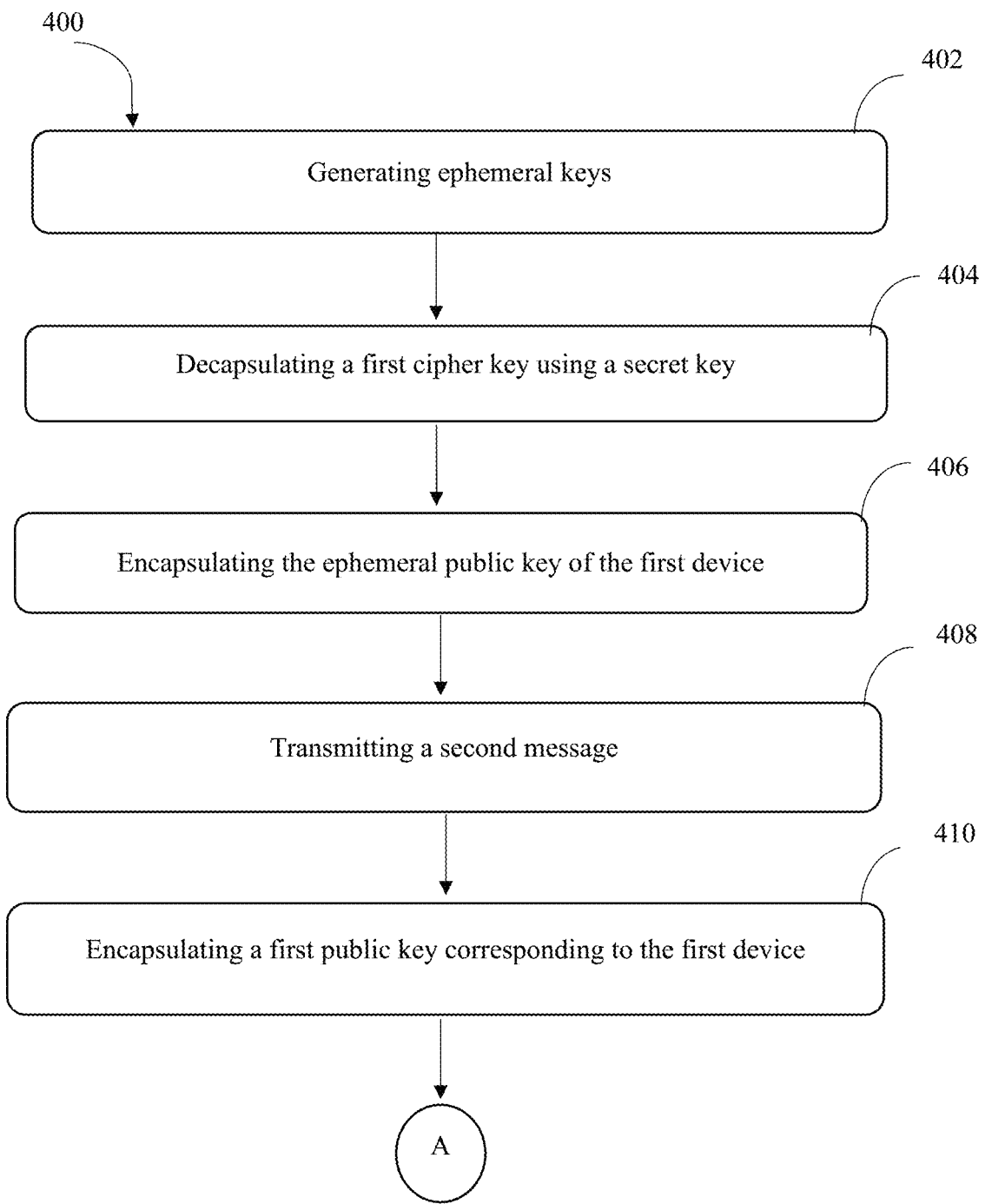
FIGS. 4A and 4B illustrates a method for establishing secure peer-to-peer (P2P) communication, in accordance with an embodiment of the present subject matter.
Figure 4B:
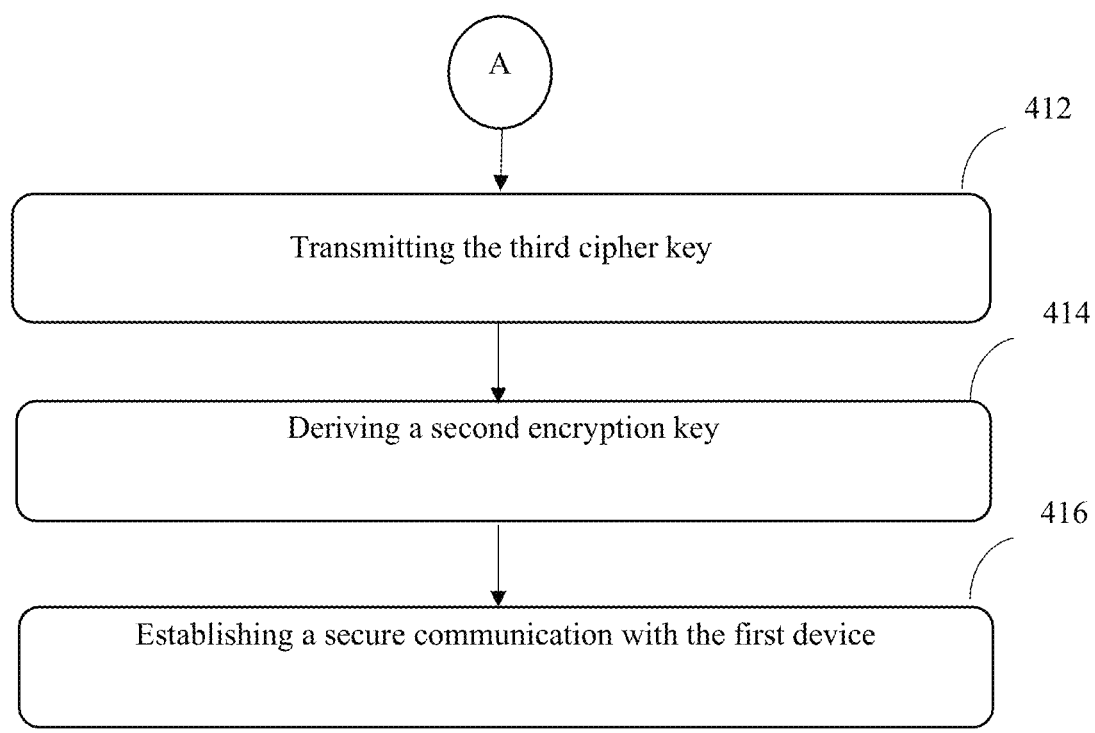

Now referring to FIG. 4, in an embodiment, the second device at step 402 may generate its own ephemeral keys. These ephemeral keys may include an ephemeral public key and an ephemeral secret key of the second device. Similar to the first device, the second device may generate these ephemeral keys for a single communication session and discard them after the session ends. This approach may enhance the security of the communication by ensuring that the keys used for a particular session cannot be reused for another session, thereby reducing the risk of key compromise.

In an embodiment, at step 404, the second device may decapsulate the first cipher key using its secret key. The decapsulation process may involve using a cryptographic algorithm to transform the first cipher key back into a shared secret key. The cryptographic algorithm used for decapsulation may be the same as or different from the cryptographic algorithm used for encapsulation at the first device. The choice of the cryptographic algorithm may depend on various factors, such as the security requirements of the communication, the computational resources available on the second device, and the compatibility of the algorithm with the first device. In an embodiment, the decapsulation process may involve applying the cryptographic algorithm to the first cipher key and the secret key of the second device. The output of the cryptographic algorithm may be a shared secret key, which may be the same as the first shared secret key generated at the first device. The shared secret key may be used for deriving a final encryption key at the second device. In other cases, the second device may decapsulate the first cipher key using a different cryptographic algorithm or a different set of parameters for the same cryptographic algorithm. This may result in a different shared secret key. The different shared secret key may be used for establishing secure communication with the first device under different conditions or requirements.

Let's provide an example of how the decapsulation process works at the second device (104-2) to generate the shared secret key. Here's a step-by-step explanation of the decapsulation process: 1. The second device (104-2) receives the first cipher key (c) from the first device (104-1). 2. The second device uses its own secret key (sk) to decapsulate the received cipher key. 3. The Kyber decapsulation algorithm is applied, which involves: a. using lattice-based operations to combine the cipher key with the secret key. b. Performing inverse polynomial operations in the same ring used for encapsulation. 4. The output of this process produces the shared secret key (ss), which should be identical to the one generated by the first device during encapsulation. Here's a pseudocode representation:

cipher_key = receive_cipher_key_from_first_device()

secret_key = get_secret_key_of_second_device()

shared_secret = kyber_decapsulate(cipher_key, secret_key)

Where:
 'cipher_key' is the first cipher key (c) received from the first device
 'secret_key' is the private key of the second device
 'shared_secret' is the resulting shared secret key (ss)

In this process: the decapsulation function ('kyber_decapsulate') takes the cipher key and the second device's secret key as inputs. The device performs the necessary lattice-based operations to recover the shared secret. The resulting 'shared_secret' should be identical to the one generated by the first device during encapsulation. This decapsulation process ensures that: 1. Only the intended recipient (the second device) can recover the shared secret, as it requires the corresponding private key. 2. Both devices end up with the same shared secret without directly transmitting it over the network. 3. The shared secret can then be used as a basis for deriving the final encryption keys for secure communication.

In an embodiment, at step 406, the second device may be configured to encapsulate the ephemeral public key of the first device to generate a second cipher key and a second shared secret key. The encapsulation process at the second device may involve using a cryptographic algorithm to transform the ephemeral public key of the first device into a cipher key and a shared secret key. The cryptographic algorithm used for encapsulation at the second device may be the same as or different from the cryptographic algorithm used for encapsulation at the first device. The choice of the cryptographic algorithm may depend on various factors, such as the security requirements of the communication, the computational resources available on the second device, and the compatibility of the algorithm with the first device. In an embodiment, the encapsulation process at the second device may involve applying the cryptographic algorithm to the ephemeral public key of the first device and a random value generated by the second device. The random value may be used as an input to the cryptographic algorithm along with the ephemeral public key of the first device. The output of the cryptographic algorithm may be a cipher key and a shared secret key. The cipher key may be used for encrypting data during the communication session, while the shared secret key may be used for deriving a final encryption key. In an embodiment, the second device may encapsulate the ephemeral public key of the first device using a different cryptographic algorithm or a different set of parameters for the same cryptographic algorithm. This may result in a different second cipher key and a different second shared secret key. The different second cipher key and the different second shared secret key may be used for establishing secure communication with the first device under different conditions or requirements.

Let's elaborate on an example of how the second device (104-2) encapsulates the ephemeral public key of the first device (104-1) to generate a second cipher key and a second shared secret key. The device uses the Kyber algorithm for encapsulation. Here's a detailed step-by-step example: 1. The second device (104-2) receives the ephemeral public key (epk1) from the first device (104-1). The second device generates a random value, let's call it 'r2'. The second device uses the Kyber algorithm to encapsulate the ephemeral public key of the first device: Initialize the Kyber parameters (n, q, k) where: n is the polynomial degree (e.g., 256), q is the modulus (e.g., 3329), k is the number of polynomials (e.g., 3). Convert the ephemeral public key (epk1) into a set of polynomials in the ring $R_q = Z_q[X]/(X^n+1)$. Generate a random polynomial 'e' with small coefficients. Compute the cipher text components: u=A r2+e (where A is derived from epk1), v=tr2+e2+encode(m) (where t is part of epk1, and m is a random message). Derive the shared secret from m using a key derivation function (KDF). The output of this process produces two components: The second cipher key (c2): This is the pair (u, v) and is intended to be sent to the first device. The second shared secret key (ss2): This is derived from m and is kept by the second device. Here's a simplified pseudocode representation:

ephemeral_public_key = receive_ephemeral_public_key_from_first_device()

-continued r2 = generate_random_value()

m = generate_random_message()

A, t = process_public_key(ephemeral_public_key)

e = generate_small_polynomial()

e2 = generate_small_polynomial()

u = polynomial_multiply(A, r2) + e v = polynomial_multiply(t, r2) + e2 + encode(m)

second_cipher_key = (u, v)

second_shared_secret = key_derivation_function(m)

In this process: the second cipher key (c2) is a transformation of the first device's ephemeral public key and the random values generated by the second device. The second shared secret key (ss2) is derived during the encapsulation process and is known only to the second device at this point. The second device will then send the second cipher key (c2) to the first device. The first device will use its ephemeral private key to decrypt this cipher key and obtain the same shared secret. This process ensures that: 1. Both devices can arrive at the same second shared secret key without directly transmitting it. 2. The security is enhanced by using ephemeral keys, providing forward secrecy. 3. The process is resistant to quantum computer attacks due to the use of post-quantum cryptography.

In an embodiment at step 408, the second device may be configured to transmit the second cipher key to the first device as part of a second message. The second message may also include the ephemeral public key of the second device and a long-term public key of the second device. The second cipher key may be transmitted in an encrypted form to protect it from unauthorized access during transmission. The encryption of the second cipher key may be performed using the ephemeral secret key of the second device.

In an embodiment, the second device may compose the second message for transmission to the first device. The second message may include several components that are critical for establishing secure communication. One such component may be the ephemeral public key of the second device. This ephemeral public key, generated as part of the ephemeral keys at the second device, may be used by the first device to generate a shared secret key. Another component of the second message may be the long-term public key of the second device. This long-term public key, which may be part of the certificate of the second device, may be used by the first device to authenticate the second device and to ensure that the second message is indeed coming from the second device. The second message may also include the second cipher key. This second cipher key, generated by encapsulating the ephemeral public key of the first device, may be used by the first device to derive the second shared secret key. The second cipher key may be transmitted in an encrypted form to protect it from unauthorized access during transmission. The encryption of the second cipher key may be performed using the ephemeral secret key of the second device. In an embodiment, the second device may transmit the second message to the first device over a secure communication channel. The secure communication channel may be established using various techniques, such as secure socket layer (SSL) or transport layer security (TLS) protocols. The secure communication channel may provide an additional layer of security by encrypting the entire communication between the first device and the second device. In other aspects, the second device may transmit the second message to the first device using a different communication protocol or a different communication channel. For example, the second device may transmit the second message over a wireless communication channel, such as a Wi-Fi or cellular network. Alternatively, the second device may transmit the second message over a wired communication channel, such as an Ethernet network. The choice of the communication protocol or the communication channel may depend on various factors, such as the capabilities of the first device and the second device, the security requirements of the communication, and the availability of the communication channels.

Referring back to FIG. 3 now, in an embodiment, at step 310, the first device may be configured to receive the second message from the second device comprising the second cipher key. In an embodiment, at step 312, the first device is configured to decapsulate the second cipher key using the ephemeral secret key of the first device to generate a second shared secret key. In an embodiment, the first device may decapsulate the second cipher key to obtain the second shared secret key. The decapsulation process may involve applying a cryptographic algorithm to the second cipher key and the ephemeral secret key of the first device. The output of the cryptographic algorithm may be the second shared secret key, which may be the same as the second shared secret key generated at the second device. The second shared secret key may be used for deriving a final encryption key at the first device.

In an embodiment, the first device may decapsulate the second cipher key using a different cryptographic algorithm or a different set of parameters for the same cryptographic algorithm. This may result in a different second shared secret key. The different second shared secret key may be used for establishing secure communication with the second device under different conditions or requirements. In other aspects, the first device may decapsulate the second cipher key using a cryptographic algorithm that is specifically designed for decapsulation. This cryptographic algorithm may provide enhanced security or efficiency compared to other cryptographic algorithms. The choice of the cryptographic algorithm for decapsulation may depend on various factors, such as the security requirements of the communication, the computational resources available on the first device, and the compatibility of the algorithm with the second device. In an embodiment, the first device may decapsulate the second cipher key in a secure environment to protect the second shared secret key from unauthorized access. The secure environment may be a secure memory area of the first device, a secure hardware module, or a secure execution environment. The secure environment may provide various security features, such as memory isolation, hardware protection, or secure execution, to protect the second shared secret key during the decapsulation process.

Referring back to FIG. 4 now, in an embodiment, at step 410, the second device may be configured to encapsulate the public key corresponding to the first device to generate a third cipher key and a third shared secret key. The generation of the third cipher key and the third shared secret key may involve encapsulating the public key of the first device. The encapsulation process may involve applying a cryptographic algorithm to the public key of the first device and a random value generated by the second device. The output of the cryptographic algorithm may be the third cipher key and the third shared secret key. The third cipher key may be used for encrypting data during the communication session, while the third shared secret key may be used for deriving a final encryption key at the second device.

In an embodiment, at step 412, the second device may transmit the third cipher key to the first device. The second device may transmit the third cipher key as a part of a third message. The third message may also include the ephemeral public key of the second device and a long-term public key of the second device. The third cipher key may be transmitted in an encrypted form to protect it from unauthorized access during transmission. The encryption of the third cipher key may be performed using the ephemeral secret key of the second device. In other aspects, the second device may transmit the third message to the first device over a secure communication channel. The secure communication channel may be established using various techniques, such as secure socket layer (SSL) or transport layer security (TLS) protocols. The secure communication channel may provide an additional layer of security by encrypting the entire communication between the first device and the second device.

In an embodiment, the second device may transmit the third message to the first device using a different communication protocol or a different communication channel. For example, the second device may transmit the third message over a wireless communication channel, such as a Wi-Fi or cellular network. Alternatively, the second device may transmit the third message over a wired communication channel, such as an Ethernet network. The choice of the communication protocol or the communication channel may depend on various factors, such as the capabilities of the first device and the second device, the security requirements of the communication, and the availability of the communication channels.

Referring back to FIG. 3, in an embodiment, at step 312, the first device may be configured to receive the third cipher key from the second device. At step 314, the first device may be configured to decapsulate the third cipher key using a secret key of the first device to achieve the third shared secret key. In an embodiment, the first device may decapsulate the third cipher key to obtain a third shared secret key. The decapsulation process may involve applying a cryptographic algorithm to the third cipher key and the secret key of the first device. The output of the cryptographic algorithm may be the third shared secret key, which may be the same as the third shared secret key generated at the second device. The third shared secret key may be used for deriving a final encryption key at the first device.

In an embodiment, the first device may decapsulate the third cipher key using a different cryptographic algorithm or a different set of parameters for the same cryptographic algorithm. This may result in a different third shared secret key. The different third shared secret key may be used for establishing secure communication with the second device under different conditions or requirements. In other aspects, the first device may decapsulate the third cipher key using a cryptographic algorithm that is specifically designed for decapsulation. This cryptographic algorithm may provide enhanced security or efficiency compared to other cryptographic algorithms. The choice of the cryptographic algorithm for decapsulation may depend on various factors, such as the security requirements of the communication, the computational resources available on the first device, and the compatibility of the algorithm with the second device. In an embodiment, the first device may decapsulate the third cipher key in a secure environment to protect the third shared secret key from unauthorized access. The secure environment may be a secure memory area of the first device, a secure hardware module, or a secure execution environment. The secure environment may provide various security features, such as memory isolation, hardware protection, or secure execution, to protect the third shared secret key during the decapsulation process.

In an embodiment, the first device and the second device may derive final encryption keys using the three shared secrets. The derivation process may involve applying a key derivation function to the three shared secrets. The key derivation function may be a cryptographic algorithm that transforms the three shared secrets into a final encryption key. The final encryption key may be used for encrypting and decrypting the communication between the first device and the second device.

For example, at step 316, the first device may derive a first encryption key using the first shared secret, the second shared secret, and the third shared secret. The derivation process at the first device may involve applying the key derivation function to the three shared secrets and a random value generated by the first device. The output of the key derivation function may be the first encryption key. The first encryption key may be used for encrypting data sent from the first device to the second device during the communication session.

Similarly, at step 414, the second device may derive a second encryption key using the first shared secret, the second shared secret, and the third shared secret. Finally at step 416, the second device may be configured to establish a secure communication with the first device by encrypting one or more messages using the second encryption key. The derivation process at the second device may involve applying the key derivation function to the three shared secrets and a random value generated by the second device. The output of the key derivation function may be the second encryption key. The second encryption key may be used for decrypting data received from the first device during the communication session. In other aspects, the first device and the second device may derive their respective final encryption keys using different key derivation functions or different sets of parameters for the same key derivation function. This may result in different final encryption keys. The different final encryption keys may be used for establishing secure communication between the first device and the second device under different conditions or requirements. In an embodiment, the first device and the second device may derive their respective final encryption keys in a secure environment to protect the final encryption keys from unauthorized access. The secure environment may be a secure memory area of the first device or the second device, a secure hardware module, or a secure execution environment. The secure environment may provide various security features, such as memory isolation, hardware protection, or secure execution, to protect the final encryption keys during the derivation process.

In an embodiment, the first device may verify the final encryption key with the second device. This verification process may involve generating a hash of the first encryption key at the first device and transmitting the hash to the second device. The second device may then compare the received hash with a hash of its own final encryption key to verify that both devices have derived the same final encryption key. If the hashes match, this may indicate that the final encryption keys derived at the first device and the second device are the same, and secure communication can be established. In an embodiment, the verification process may involve additional steps or different techniques. For example, the first device may generate a digital signature using the first encryption key and transmit the digital signature to the second device. The second device may then verify the digital signature using the first final encryption key to ensure that the first final encryption key was indeed generated by the first device. This approach may provide an additional layer of security by authenticating the source of the final encryption key.

In other aspects, the second device may also verify the final encryption key with the first device. This verification process may involve generating a hash of the second final encryption key at the second device and transmitting the hash to the first device. The first device may then compare the received hash with a hash of its own final encryption key to verify that both devices have derived the same final encryption key. If the hashes match, this may indicate that the final encryption keys derived at the first device and the second device are the same, and secure communication can be established. In an embodiment, the verification process may involve additional steps or different techniques. For example, the second device may generate a digital signature using the second final encryption key and transmit the digital signature to the first device. The first device may then verify the digital signature using the second final encryption key to ensure that the second final encryption key was indeed generated by the second device. This approach may provide an additional layer of security by authenticating the source of the final encryption key.

Figure 5:
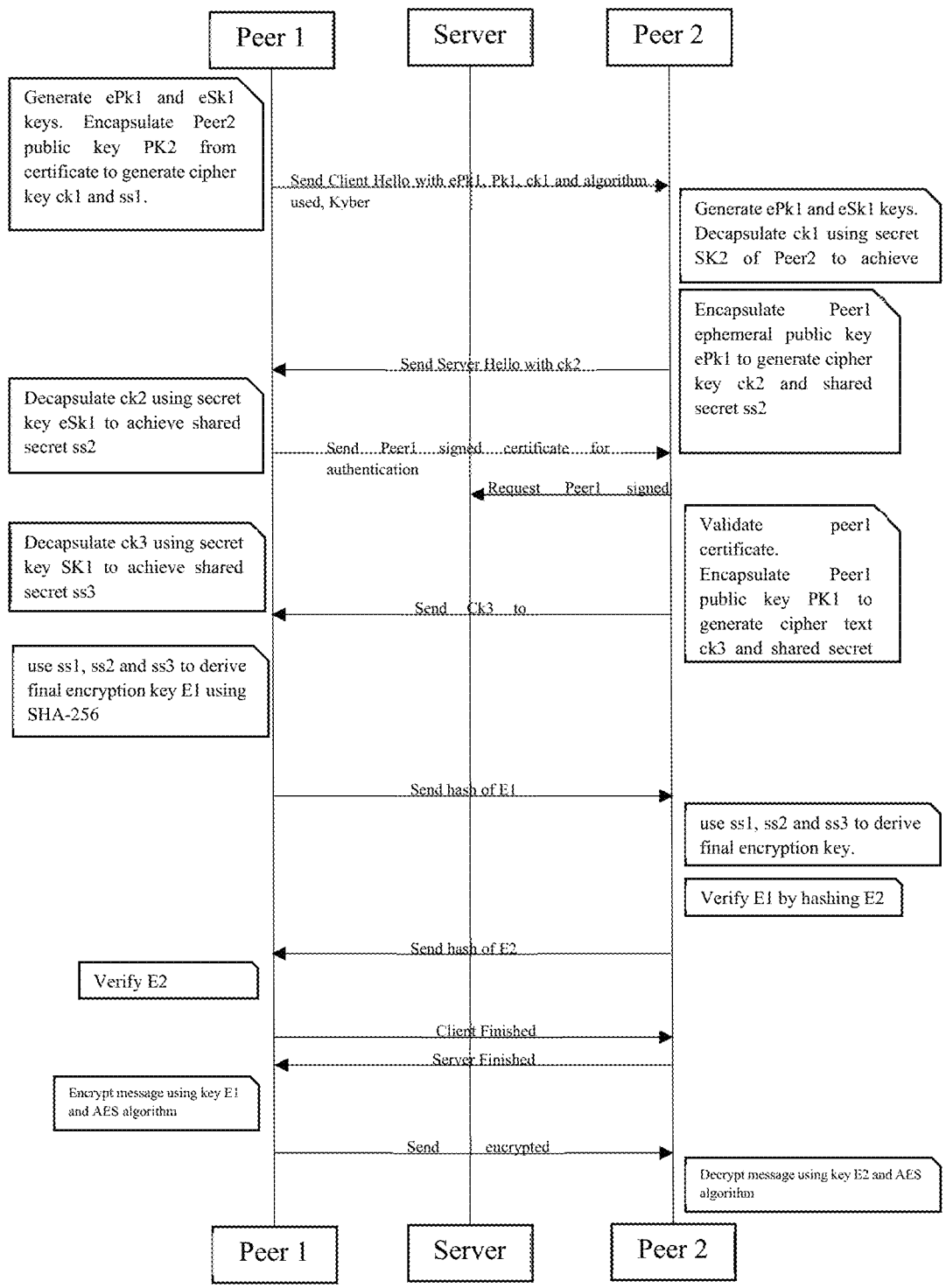
FIG. 5 illustrates a method for establishing secure peer-to-peer (P2P) communication between two peer devices, in accordance with an embodiment of the present subject matter.

In an embodiment, once the final encryption keys have been verified, the first device and the second device may establish secure communication using the verified final encryption keys at step 318 and 418. The secure communication may involve encrypting and decrypting data using the final encryption keys. The encryption and decryption processes may be performed using various cryptographic algorithms, such as the Advanced Encryption Standard (AES) or the Rivest-Shamir-Adleman (RSA) algorithm. The choice of the cryptographic algorithm may depend on various factors, such as the security requirements of the communication, the computational resources available on the first device and the second device, and the compatibility of the algorithm with the devices. Referring to FIG. 5, the FIG. 5 illustrates an end to end method 300 and 400 to establish a secure communication between the first device and the second device.

In an embodiment, the method for establishing secure communication between the first device (104-1) and the second device (104-2) may further comprise a rekeying process. This process allows for the generation and use of new encryption keys within an existing secure communication session, enhancing the overall security of the system. The rekeying process may be implemented based on one or more conditions like a) time duration: a predetermined time interval has elapsed since the last key generation or rekeying event, b) data volume: a specified amount of data has been transmitted using the current encryption key. c) session events: certain session-related events occur, such as reaching a specific number of messages exchanged, d) anomaly detection e) certificate expiry f) software uninstall and install, and the like.

In an exemplary embodiment the rekeying process is triggered based on a predetermined time interval that has elapsed since the last key generation or rekeying event. Example: the first device (104-1) and second device (104-2) have established a secure communication channel at 9:00 AM using an initial set of encryption keys. The system is configured to initiate rekeying every 4 hours. At 1:00 PM, the 4-hour interval has elapsed. The first device initiates the rekeying process by generating new ephemeral keys. The first device then sends a rekeying message to the second device, triggering the key renewal process. Both devices generate and verify new encryption keys, maintaining secure communication with enhanced security. In yet another example, a specified amount of data has been transmitted using the current encryption key. Example: the secure communication system is configured to initiate rekeying after every 1 GB of data transmitted. The first device (104-1) has been sending large files to the second device (104-2). After transmitting 998 MB of data, the first device prepares to send another 5 MB file. Recognizing that this transmission will exceed the 1 GB threshold, the first device initiates the rekeying process before sending the file. New keys are generated and verified, and the 5 MB file is then sent using the new encryption key. In yet another embodiment, certain session-related events occur, such as reaching a specific number of messages exchanged. Example: The system is set to initiate rekeying after every 10,000 messages exchanged. The first device (104-1) and second device (104-2) have been exchanging short messages in a chat-like application. As the 9,999th message is sent, the devices may recognize that the next message will trigger rekeying. Before sending the 10,000th message, the first device initiates the rekeying process. Both devices generate new keys, verify them, and continue communication with enhanced security. In yet another embodiment, the secure communication method employs an anomaly detection algorithm that monitors traffic patterns between the first device (104-1) and the second device (104-2). For example, the first device and the second device may have an anomaly detection algorithm. For example, During normal operation, the devices exchange data at an average rate of 1 MB per minute. Suddenly, the system detects a spike in data transfer, reaching 10 MB per minute for a sustained period of 5 minutes. This unusual pattern triggers the anomaly detection algorithm. As a precautionary measure, the first device initiates the rekeying process. Both devices generate new encryption keys and verify them before resuming communication with the new, uncompromised keys. In yet another exemplary embodiment, the first device (104-1) and second device (104-2) use digital certificates for authentication, with each certificate valid for one year. For example, the current secure session was established on Jun. 1, 2024, using certificates set to expire on Jul. 1, 2024. On Jun. 30, 2024, during a routine check, the first device detected that its certificate would expire in 24 hours. The first device initiates the rekeying process, which in this case may include: Obtaining a new certificate from the certificate authority. 2. Generating new encryption keys. 3. Exchanging the new certificate and public key information with the second device. 4. Verifying the new keys and certificates. The devices then switch to using the new certificates and encryption keys, ensuring uninterrupted secure communication beyond the original certificate expiry date.

In yet another exemplary embodiment, software uninstalls, and install may occur. For example, the secure communication system runs on specialized software installed on both the first device (104-1) and second device (104-2). The IT department of the organization decides to upgrade the software to a newer version with enhanced features. The upgrade process on the first device may involve: 1. Uninstalling the current version of the software. 2. Installing the new version. 3. Restarting the device. Upon restarting with the new software version, the first device detects the change in its environment. As a security measure, it automatically initiates the rekeying process with the second device. Both devices generate new encryption keys, exchange necessary information, and verify the new keys. The secure communication resumes with the new software version and freshly generated keys, ensuring that any potential vulnerabilities in the old software version do not compromise the new session. In yet another exemplary embodiment, the device may detect failure in message decryption. Example: the first device (104-1) and second device (104-2) have been communicating securely for several hours. The second device attempts to decrypt a message received from the first device but fails repeatedly. After three consecutive decryption failures, the second device initiates the rekeying process. The device sends a rekeying request to the first device, indicating the decryption failure as the reason. Both devices then: 1. Generate new ephemeral keys. 2. Exchange necessary information to derive new shared secrets. 3. Create a new final encryption key. 4. Verify the new keys through secure hash exchange. Once the new keys are established and verified, the first device resends the failed message encrypted with the new key. The second device successfully decrypts the message with the new key, and secure communication continues. In each of these scenarios, the rekeying process serves as a proactive or reactive measure to maintain the integrity and security of the communication channel. By initiating rekeying in response to various triggers—be it anomalies, expiring certificates, software changes, or decryption failures—the system ensures that it can adapt to changing conditions and potential security threats, thereby maintaining a robust and secure communication environment.

In an embodiment, when rekeying is initiated, the first device may (104-1) perform one or more steps like generating new ephemeral keys. The first device generates a new set of ephemeral keys, including a new ephemeral public key and a new ephemeral secret key. The first device may then encapsulate the second device's public key. Using the second device's public key (obtained from its certificate), the first device encapsulates to generate a new cipher key and a new shared secret key. The first device may then transmit a rekeying message, the first device may send a rekeying message to the second device, comprising one or more of: new ephemeral public key, new cipher key, a rekeying identifier or flag. In an embodiment, the first device may wait and receive a response from the second device, which may comprise a new cipher key generated by the second device. In an embodiment, the first device may decapsulate the received cipher key using its new ephemeral secret key to obtain a new shared secret key from the second device. Finally, the first device may derive a new final encryption key: using the newly generated shared secret keys, the first device derives a new final encryption key, following a process similar to the initial key derivation. In an embodiment, the first device may generate a hash of the new final encryption key and transmit it to the second device for verification. The first device may also receive a hash of the second device's new final encryption key and verify it. In an embodiment, the first device may, upon successful verification, switch to using the new final encryption key for subsequent communications. To ensure smooth transition and prevent communication disruptions, the rekeying process may include a synchronization mechanism where both devices agree on when to switch to the new key. This may involve including a sequence number or timestamp in the rekeying messages to coordinate the key switch.

In an embodiment, in case of rekeying failure, the devices may retain the previous encryption key for a predetermined period. If decryption fails with the new key, they can temporarily fall back to the previous key and reinitiate the rekeying process. In an embodiment, the rekeying process uses the existing secure channel for transmitting new key material. All rekeying messages are encrypted using the current encryption key to prevent eavesdropping during the key exchange. In an embodiment, the frequency of rekeying is configurable and can be adjusted based on the security requirements of the application. For high-security applications, more frequent rekeying (e.g., every hour) may be implemented. For less critical applications, rekeying may occur less frequently (e.g., daily or weekly). In an embodiment, the devices may maintain a limited history of previous keys to handle out-of-order messages or delayed packets that were encrypted with a recently retired key. This rekeying embodiment enhances the security of the communication system by 1. limiting the amount of data encrypted with any single key, reducing the impact of potential key compromises. 2. Providing forward secrecy, as compromising a current key does not compromise past communications encrypted with previous keys. 3. Allowing for dynamic adjustment of security parameters without needing to re-establish the entire secure connection. By implementing this rekeying process, the secure communication method adapts to long-running sessions and maintains a high level of security throughout the duration of the communication between the first and second devices.

In an embodiment, secure communication may be established for a single communication session. At the end of the session, the final encryption keys may be discarded or erased from the devices. This approach may enhance the security of the communication by ensuring that the final encryption keys used for a particular session cannot be reused for another session, thereby reducing the risk of key compromise. In other aspects, the secure communication may be established for multiple communication sessions. In this case, the final encryption keys may be stored in a secure memory area of the first device and the second device for use in future sessions. The secure memory area may be protected from unauthorized access to prevent the compromise of the final encryption keys. After each session, the final encryption keys may be updated or replaced with new final encryption keys derived using new shared secrets.

Thus, as discussed in the above method, the secure communication may be established without involving a server after the initial authentication. This approach may provide a peer-to-peer communication model, where the first device and the second device communicate directly with each other without the need for a central server. This may enhance the privacy and security of the communication by reducing the risk of server compromise or eavesdropping by third parties. The server may provide additional services, such as key management, certificate management, or secure routing, to facilitate the secure communication between the first device and the second device.

In an embodiment, the first device and the second device may derive their respective final encryption keys using a Secure Hash Algorithm (SHA-256) hash function. The SHA-256 hash function may be applied to the three shared secrets to generate a hash value. This hash value may then be used as the final encryption key for encrypting and decrypting the communication between the first device and the second device. The use of the SHA-256 hash function for deriving the final encryption keys may provide several advantages. For example, the SHA-256 hash function may provide a high level of security due to its resistance to collision attacks, where two different inputs produce the same hash output. This may ensure that the final encryption keys are unique and cannot be easily guessed or derived by unauthorized parties. In an embodiment, the first device and the second device may use different hash functions or different sets of parameters for the same hash function to derive their respective final encryption keys. This may result in different final encryption keys, which may be used for establishing secure communication under different conditions or requirements.

In an embodiment, HKDF (HMAC-based Key Derivation Function) may be used to derive the final encryption key from the three shared secrets. This provides a cryptographically secure way to combine the secrets. The derived final key may be used with AES-GCM, which provides both confidentiality and authenticity for the encrypted messages. For each message, a new nonce (number used once) is generated to ensure that even identical messages encrypt to different ciphertexts. The encrypted message includes the nonce prepended to the ciphertext, allowing the recipient to decrypt it correctly. This process ensures that, the final encryption key is derived from all three shared secrets, increasing security. Each message is encrypted with authenticated encryption, providing confidentiality and integrity. The use of nonces prevents replay attacks and ensures unique ciphertexts.

In an embodiment, the first device and the second device may store their respective final encryption keys in a secure memory area after the derivation process. The secure memory area may be protected from unauthorized access to prevent the compromise of the final encryption keys. After the communication session ends, the final encryption keys may be erased or overwritten to ensure that they cannot be reused or recovered. In an embodiment, the first device and the second device may use the final encryption keys to encrypt and decrypt messages for secure communication. The encryption and decryption processes may involve using a cryptographic algorithm, such as the Advanced Encryption Standard (AES) algorithm. The AES algorithm is a symmetric key algorithm that provides a high level of security and is widely used for encrypting data. The AES algorithm may be used to encrypt data using the final encryption key at the sending device and to decrypt the encrypted data using the same final encryption key at the receiving device.

In an embodiment, the first device may encrypt a message using the first encryption key and the AES algorithm. The encryption process may involve applying the AES algorithm to the message and the first final encryption key to generate an encrypted message. The first device may then transmit the encrypted message to the second device over a secure communication channel. Upon receiving the encrypted message, the second device may decrypt the message using the second final encryption key and the AES algorithm. The decryption process may involve applying the AES algorithm to the encrypted message and the second final encryption key to recover the original message. The decrypted message may then be processed or displayed at the second device.

In other aspects, the second device may also encrypt a message using the second final encryption key and the AES algorithm and transmit the encrypted message to the first device. The first device may then decrypt the message using the first final encryption key and the AES algorithm. In an embodiment, the AES algorithm may be used with different key sizes or different modes of operation to encrypt and decrypt messages. For example, the AES algorithm may be used with a key size of 128, 192, or 256 bits, and may operate in Electronic Codebook (ECB), Cipher Block Chaining (CBC), Counter (CTR), or other modes. The choice of the key size and the mode of operation may depend on various factors, such as the security requirements of the communication, the computational resources available on the first device and the second device, and the compatibility of the AES algorithm with the devices.

In an embodiment, the first device may periodically check the validity of the stored digital certificate with the certificate authority server. This periodic check may be performed at regular intervals, such as every hour, every day, or every week, or may be triggered by specific events, such as the initiation of a secure communication session, the receipt of a request for secure communication from the second device, or the detection of a security threat. The periodic check may involve sending a request to the certificate authority server to verify the validity of the stored digital certificate. The request may include information such as the certificate identifier, the public key of the first device, or a timestamp indicating the time of the last validity check.

Upon receiving the request, the certificate authority server may verify the validity of the stored digital certificate by comparing the information in the request with the information stored in the server. The server may then send a response to the first device indicating whether the stored digital certificate is valid or not. If the stored digital certificate is valid, the first device may continue to use it for secure communication. If the stored digital certificate is not valid, the first device may take appropriate actions, such as revoking the stored digital certificate, generating a new CSR, or terminating the secure communication session.

In an embodiment, the first device may request a new digital certificate from the certificate authority server if the stored digital certificate is revoked or expired. The request for a new digital certificate may involve generating a new CSR using a new public key and a new secret key of the first device and transmitting the new CSR to the certificate authority server. Upon receiving the new CSR, the certificate authority server may generate a new digital certificate for the first device, sign the new digital certificate using the server's private key, and transmit the new signed digital certificate to the first device. The first device may then store the new signed digital certificate for use in future secure communications.

In an embodiment, the secure communication method may be implemented as instructions stored on a non-transitory computer-readable storage medium. The instructions, when executed by a processor of a device, may cause the device to perform the operations of generating ephemeral keys, encapsulating a public key of another device, transmitting a message to the other device, decapsulating a cipher key, deriving a final encryption key, and establishing secure communication. The non-transitory computer-readable storage medium may include various types of storage media, such as magnetic storage media, optical storage media, solid-state storage media, or any other type of storage media suitable for storing electronic information.

In an embodiment, the certificate authority server may set an expiration on the certificate of authority. The expiration may be set to a specific date and time, after which the certificate of authority is no longer valid. The expiration may prompt the devices to periodically renew their certificates by generating new CSRs and requesting new signed certificates from the certificate authority server. This approach may enhance the security of the communication by ensuring that the certificates used for authentication are always up-to-date and valid.

In an embodiment, the secure communication method may incorporate a sophisticated anomaly detection process leveraging AI agents to enhance the security of peer-to-peer (P2P) communications. For example, this process may operate in parallel with the certificate-based authentication process, providing an additional layer of security that goes beyond traditional static security measures. In an embodiment, the anomaly detection process may be implemented on each of the peer devices. For example, the peer device may continuously monitor its own attributes including, but not limited to local geolocation data from GPS or network information, device IP address and changes during a session, Network characteristics (Wi-Fi, cellular, ethernet), operating system information and updates, authentication timestamps and patterns, device-specific identifiers (device ID, IMEI, MAC address), hardware configuration details, installed application list and versions, battery level and charging status, sensor data (accelerometer, gyroscope), and the like. The AI agents monitor the device's IP address and take corrective measures like rekeying the PQC authentication when a user is not in their usual work or home locations. This can be explained with one or more examples, when a user travels to the United States from India for business, the AI agent detects the change in IP address and location, triggering additional authentication and rekeying processes. In yet another example, if a user typically connects via a corporate VPN but suddenly accesses the system through a public Wi-Fi network, the AI agent initiates rekeying due to the potential security risk. In another example, when a user logs in during atypical hours (e.g., 3 AM local time) from an unfamiliar IP address, the AI agent prompts for additional verification and initiates rekeying. In yet another example, if the system detects logins from geographically distant locations within a short timeframe (e.g., New York and Tokyo within an hour), the AI agent flags this as suspicious and triggers rekeying. In an example, upon detecting significant hardware or software changes (e.g., operating system update, new device identifiers), the AI agent initiates rekeying to ensure continued secure communication. These examples demonstrate how AI agents can adapt to various scenarios, enhancing the system's ability to maintain security in diverse and dynamic user environments.

In an embodiment, the AI agent underpinning the anomaly detection process may be trained on extensive historical data of normal device behaviour and communication patterns. This training data may encompass a diverse range of devices, users, and usage scenarios to ensure robust anomaly detection across various contexts. During each communication session, the AI agent may analyse the current device and network attributes in real-time, comparing them to the learned patterns of normal behaviour. The model may employ advanced techniques such as sequence modeling to detect anomalies in the temporal patterns of device behaviour, and may utilize unsupervised learning methods to identify novel types of anomalies not present in the training data. For example, the AI agent may detect anomalies when there are significant deviations from the expected patterns. For example: 1. If a device suddenly attempts to authenticate from a geo-location that is inconsistent with its historical pattern or physically impossible given the time since the last known location. 2. If there is an unexpected change in the device's operating system or hardware configuration. 3. If the authentication attempts exhibit unusual timing patterns or frequencies. 4. If the network characteristics change in a way that is inconsistent with normal handovers or roaming behaviour. 5. If the device exhibits unusual sensor data patterns that might indicate it has been stolen or is being operated under duress. In an embodiment the AI agent may provide insights into why specific anomalies were detected. This explainability may be crucial for security analysts to understand and validate the peer devices' decisions, as well as for continually refining the anomaly detection criteria.

In an embodiment, when an anomaly is detected, the peer device may take immediate and decisive action to protect the security of the communication. For example, the action may include one or more of: 1. Immediately destroying the current ephemeral keys and session keys associated with the ongoing communication session. For example, destroying by any of the peer devices at least one of the ephemeral secret keys, the first shared secret key, the second shared secret key, the third shared secret key, the first encryption key, and the second encryption key. The destruction process may involve securely erasing the keys from the device's memory using techniques that overwrite the memory locations multiple times with random data to prevent any potential recovery. 2. Logging the detected anomaly with detailed information about the nature of the anomaly and the context in which it was detected. This log may be securely stored for later analysis and may be transmitted to a secure server if network conditions allow. 3. Optionally, depending on the severity of the detected anomaly, the device may trigger additional security measures such as requiring additional authentication factors, temporarily disabling certain device functionalities, or alerting a security operations centre. 4. Automatically reinitiating the handshake process, as discussed in the above method. This may involve generating new ephemeral keys, performing the key encapsulation process, and deriving new shared secret keys and final encryption keys. In an embodiment, the anomaly detection process may be implemented on both communicating peer devices, allowing each device to independently monitor for anomalies and initiate the key destruction and handshake reinitiation process if necessary. This distributed approach may provide additional resilience against attacks that compromise one of the devices. In yet another embodiment, the anomaly detection process may be implemented on the server.

In an embodiment, the peer device may also incorporate a sophisticated feedback mechanism where the results of the anomaly detection are used to continuously update and improve the AI agent. This may involve one or more steps like 1. Securely collecting anonymized data about detected anomalies and their contexts. 2. Periodically retraining the AI agent with this new data to enhance its ability to distinguish between normal variations in device behaviour and genuine security threats 3. Employing federated learning techniques to allow the model to learn from data across multiple devices without centralizing sensitive information.

By incorporating this advanced anomaly detection process, the secure communication method may provide enhanced protection against a wide range of sophisticated attacks. These may include attacks that attempt to exploit subtle changes in device or network characteristics, social engineering attacks that involve unusual device usage patterns, and novel attack vectors that have not been previously observed. This approach may significantly strengthen the overall security of the P2P communication system, adapting to new threats and evolving attack patterns over time.

The method and device disclosed in the present application has various advantages and the same are listed below: The system for E2E encryption in P2P communication using Post Quantum Cryptography may offer several advantages: 1. Quantum-resistant security: The system may provide protection against potential attacks by quantum computers, which could break traditional cryptographic algorithms. 2. Forward secrecy: By generating new session keys for each communication session, the system may ensure that even if one session is compromised, past and future sessions remain secure. 3. End-to-end encryption: The system may provide secure communication between peers without relying on intermediaries, reducing the risk of man-in-the-middle attacks. 4. Authentication: The use of certificates and public key verification may help ensure the authenticity of communicating with peers. 5. Data integrity: The system may incorporate mechanisms to verify the integrity of transmitted data, protecting against tampering or corruption. 6. Flexibility: The system may support a list of algorithms, allowing for adaptation to different security requirements or computational capabilities. 7. Key encapsulation: The use of key encapsulation mechanisms may provide an additional layer of security for key exchange. 8. Mutual authentication: Both peers may authenticate each other, reducing the risk of impersonation attacks. 9. Scalability: The system may be suitable for peer-to-peer networks, which can scale more easily than centralized systems. 10. Compatibility: The system may be designed to work with existing network infrastructures and protocols. 11. Freshness: The use of nonces may help prevent replay attacks and ensure the freshness of each communication session. 12. Key derivation: The use of key derivation functions may allow for the generation of multiple keys from a single shared secret, enhancing security. 13. Protocol abortion: The system may include mechanisms to abort the protocol if inconsistencies are detected, preventing potential security breaches. 14. Symmetric encryption: After the initial key exchange, the system may use efficient symmetric encryption for bulk data transfer. 15. Post-quantum readiness: The system may provide a pathway for transitioning to post-quantum cryptography as quantum computing advances.

I claim:

1. A method for establishing secure communication between a first device and a second device, comprising:
   generating, by a first device, a first ephemeral public key and a first ephemeral secret key of the first device;
   encapsulating, by the first device, a second public key corresponding to the second device to generate a first cipher key and a first shared secret key;
   transmitting, by the first device, a first message, to the second device, wherein the first message comprises the ephemeral first public key, a first public key corresponding to the first device, and the first cipher key;
   receiving, by the first device, a second message, from the second device, wherein the second message comprises a second cipher key;
   decapsulating, by the first device, the second cipher key using the first ephemeral secret key to generate a second shared secret key;
   receiving, by the first device, a third message comprising a third cipher key from the second device;
   decapsulating, by the first device, the third cipher key using a first secret key of the first device to generate a third shared secret key;
   deriving, by the first device, a first encryption key using the first shared secret key, the second shared secret key, and the third shared secret key; and
   establishing, by the first device, a secure communication with the second device by encrypting one or more messages using the first encryption key.

2. The method of claim 1, wherein establishing the secure communication further comprises:
   transmitting, by the first device, a hash of the first encryption key for verification, to the second device;
   receiving, by the first device, a hash of a second encryption key from the second device;

verifying, by the first device, the received second encryption key by hashing the first encryption key; and upon receiving verification from the second device, establishing the secure communication by the first device.

3. The method of claim 2 further comprises:

transmitting, by the first device, the encrypted one or more messages to the second device.

4. The method of claim 1 further comprises:

generating by the first device the first public key and a first secret key corresponding to the first device.

5. A method of claim 4 further comprises:

generating a certificate signing request (CSR) at the first device using the first public key and the first secret key;

transmitting the CSR to an authenticating server; and receiving a signed certificate from the authenticating server for the first device.

6. The method of claim 1 further comprises:

requesting by the first device a certificate corresponding to the second device from an authenticating party; and receiving by the first device the certificate corresponding to the second device, wherein the certificate comprises the second public key.

7. The method of claim 1, further comprising:

transmitting, by the first device, a first devices signed certificate to the second device for authentication.

8. A method for establishing secure communication between a first device and a second device, comprising:

generating, by a second device, a second ephemeral public key and a second ephemeral secret key of the second device;

decapsulating, by the second device, a first cipher key using a second secret key of the second device to generate a first share secret key;

encapsulating, by the second device, a first ephemeral public key of the first device to generate a second cipher key and a second shared secret key;

transmitting, by the second device, a second message to the first device, wherein the second message comprises the second cipher key;

encapsulating, by the second device, a first public key corresponding to the first device to generate a third cipher key and a third shared secret key;

transmitting, by the second device, a third message to the first device, wherein the third message comprises the third cipher key;

deriving, by the second device, a second encryption key using the first shared secret key, the second shared secret key, and the third shared secret key; and establishing, by the second device, a secure communication with the first device by encrypting one or more messages using the second encryption key.

9. The method of claim 8, wherein establishing the secure communication further comprises:

receiving, by the second device, a hash of a first encryption key from the first device;

verifying, by the second device, the first encryption key by hashing the second encryption key;

transmitting, by the second device, a hash of the second encryption key to the first device; and upon receiving verification from the first device, establishing the secure communication by the second device.

10. The method of claim 9 further comprises:

receiving, by the second device, encrypted one or more messages, from the first device; and decrypting, by the second device, the encrypted one or more messages by using the second encryption key.

11. The method of claim 8 further comprises:

receiving by the second device a first singed certificate corresponding to the first device;

requesting from a server a second singed certificate corresponding to the first device; and comparing the first signed certificate and the second signed certificate to validate the authenticity of the first device.

12. The method of claim 11 further comprises:

generating by the second device a second public key and the second secret key corresponding to the second device.

13. The method of claim 12 further comprises:

generating, by the second device, a certificate signing request (CSR) at the second device using the second public key and the second secret key;

transmitting, by the second device, the CSR to an authenticating server; and receiving, by the second device, the signed certificate from the authenticating server for the second device.

* * * * *